(12) United States Patent
Chen et al.

(10) Patent No.: US 11,422,729 B2
(45) Date of Patent: Aug. 23, 2022

(54) METHOD, DEVICE, AND COMPUTER READABLE STORAGE MEDIUM FOR DATA RELOCATION BASED ON PERIODICITY OF ACCESS FREQUENCY OF THE DATA

(71) Applicant: EMC IP Holding Company LLC, Hopkinton, MA (US)

(72) Inventors: Chi Chen, Chengdu (CN); Weilan Pu, Chengdu (CN); Ruiyang Zhang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/884,265

(22) Filed: May 27, 2020

(65) Prior Publication Data

US 2021/0117121 A1  Apr. 22, 2021

(30) Foreign Application Priority Data

Oct. 21, 2019  (CN) .......................... 201911001175.3

(51) Int. Cl.
 G06F 3/06 (2006.01)
(52) U.S. Cl.
 CPC ............ G06F 3/0647 (2013.01); G06F 3/061 (2013.01); G06F 3/0685 (2013.01)
(58) Field of Classification Search
 CPC ................. G06F 3/0647; G06F 3/0685; G06F 3/0646–0649; G06F 3/061
 See application file for complete search history.

(56) References Cited

U.S. PATENT DOCUMENTS

| | | |
|---|---|---|
| 8,782,324 B1 | 7/2014 | Chen et al. |
| 8,799,601 B1 | 8/2014 | Chen et al. |
| 8,909,887 B1 | 12/2014 | Armangau et al. |
| 8,954,699 B1 | 2/2015 | Chen et al. |
| 9,594,514 B1 | 3/2017 | Bono et al. |
| 9,959,054 B1 | 5/2018 | Vankamamidi et al. |
| 10,402,091 B1 | 9/2019 | Vankamamidi et al. |
| 10,552,056 B2 | 2/2020 | Marchenko et al. |
| 10,613,790 B1 | 4/2020 | Armangau et al. |
| 10,860,496 B2 | 12/2020 | Li et al. |
| 11,042,324 B2 | 6/2021 | Shveidel et al. |
| 11,157,194 B2 * | 10/2021 | Kimmel ................ G06F 17/156 |
| 2015/0381734 A1 * | 12/2015 | Ebihara .................. G06F 3/067 709/203 |
| 2016/0291886 A1 * | 10/2016 | Kelkar ................. G06F 3/0659 |

OTHER PUBLICATIONS

Periodic Functions. Article [online]. Math is Fun, Mar. 18, 2018 [retrieved on May 27, 2021], Retrieved from the Internet: <URL: https://web.archive.org/web/20180318112616/https://www.mathsisfun.com/algebra/amplitude-period-frequency-phase-shift.html> (Year: 2018).*

* cited by examiner

*Primary Examiner* — Chie Yew
(74) *Attorney, Agent, or Firm* — BainwoodHuang

(57) ABSTRACT

Techniques for data relocation involve: determining whether access frequency of a data block in a multi-tier storage system is periodic; in response to determining that the access frequency of the data block is periodic, determining a change cycle of the access frequency of the data block; and determining, based on the change cycle of the access frequency of the data block, priority of relocating the data block in the multi-tier storage system.

15 Claims, 8 Drawing Sheets

METHOD, DEVICE, AND COMPUTER READABLE STORAGE MEDIUM FOR DATA RELOCATION BASED ON PERIODICITY OF ACCESS FREQUENCY OF THE DATA

CROSS-REFERENCE TO RELATED APPLICATION

This application claims priority to Chinese Patent Application No. CN201911001175.3, on file at the China National Intellectual Property Administration (CNIPA), having a filing date of Oct. 21, 2019, and having "METHOD, DEVICE, AND COMPUTER READABLE STORAGE MEDIUM FOR DATA RELOCATION" as a title, the contents and teachings of which are herein incorporated by reference in their entirety.

FIELD

Embodiments of the present disclosure generally relate to storage systems, and more specifically, to a method, device and computer readable storage medium for data relocation.

BACKGROUND

In some tiered storage systems, the storage device at each tier is different in access efficiency and capacity. Typically, a tier with high access frequency has a small capacity and incurs high costs while a tier with a large capacity and low costs has low access frequency. As such, data relocation can be performed among different tiers based on the access frequency of data. The relocation is generally performed according to a preset schedule, or performed manually. However, in some cases, it is still difficult for the current relocation solution to predict accurately whether relocation should be performed.

SUMMARY

The embodiments of the present disclosure provide a method, device, computer readable storage medium and computer program product for data relocation.

In a first aspect, there is provided a method for data relocation. The method includes: determining whether access frequency of a data block in the multi-tier storage system is periodic; in response to determining that the access frequency of the data block is periodic, determining a change cycle of the access frequency of the data block; and determining, based on the change cycle of the access frequency of the data block, priority of relocating the data block in the multi-tier storage system.

In a second aspect, there is provided a device for data relocation. The device includes: a processing unit; and a memory coupled to the processing unit and having instructions stored thereon, the instructions when executed by the processing unit causing the device to execute acts including: determining whether access frequency of a data block in the multi-tier storage system is periodic; in response to determining that the access frequency of the data block is periodic, determining a change cycle of the access frequency of the data block; and determining, based on the change cycle of the access frequency of the data block, priority of relocating the data block in the multi-tier storage system.

In a third aspect, there is provided a computer readable storage medium having machine executable instructions stored thereon, the machine executable instructions, when executed by at least one processor, causing the at least one processor to implement the method according to the first aspect.

In a fourth aspect, there is provided a computer program product stored on a computer readable medium and including machine executable instructions, the machine executable instructions, when executed, causing a machine to execute the method according to the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description on the example embodiments of the present disclosure with reference to the accompanying drawings, the above and other objectives, features and advantages of the present disclosure will become more apparent, in which the same reference symbols refer to the same components.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred embodiments disclosed herein will be described in detail below with reference to the accompanying drawings. Although the drawings illustrate the preferred embodiments of the present disclosure, it would be appreciated that the present disclosure can be implemented in various forms but cannot be limited by the embodiments described herein. Rather, those embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one other embodiment." The terms "first," "second," and the like may refer to different or same objects. Other definitions, explicit and implicit, may be included below.

Figure 1:
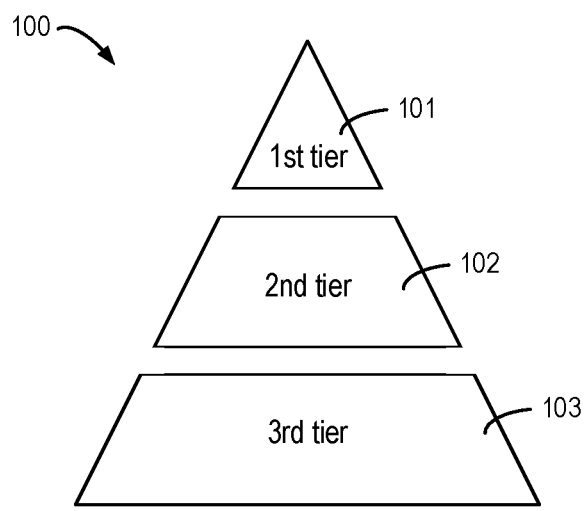
FIG. 1 illustrates a schematic diagram of a storage system according to some embodiments of the present disclosure.

FIG. 1 illustrates a schematic diagram of a storage system 100 according to some embodiments of the present disclosure. As shown, the storage system 100 includes a first tier 101, a second tier 102 and a third tier 103. From the first tier 101 to the third tier 103, the storage capacity is increased while the access performance is decreased. For example, the first tier 101 may be an extreme performance tier, the second tier 102 may be a performance tier, and the third tier 103 may be a capacity tier. For instance, the first tier 101 may include a flash memory; the second tier 102 may include a Serial Attached Small Computer System Interface (SCSI) (SAS) memory, such as a storage device with a speed of 15 k rpm or 10 k rpm; and the third tier 103 may include, for example, a near-line SAS (NL-SAS) storage device with a speed of 7.2 k rpm. It would be appreciated that the above storage system is provided merely as an example, which may include more or fewer tiers and may be configured with any other appropriate storage device, in the embodiments of the present disclosure.

Due to different characteristics of different tiers, data may be relocated among different tiers according to access frequency of the data. Data are typically relocated between different tiers in units of data blocks or slices. For example, if a data block is accessed frequently, the data block may be moved to the first tier 101; otherwise, the data block may be moved to the third tier 103. For example, a data block may have a size of 256 MB, or any other appropriate size.

In a storage system, most of the data access frequency shows a time series pattern. For example, non-stationary time series have four patterns, namely trend, cyclic, seasonal and irregular patterns. The trend pattern means that access frequency shows a long-term increase or decrease trend. The cyclic pattern means that access frequency rises and falls periodically. The cycle in the cyclic pattern is not necessarily fixed, which may be changed among several cycles. The seasonal pattern means that a time series is affected by seasonal factors, and data change in a fixed regularity (for example, daily, weekly, monthly, yearly or the like). The irregular pattern means that data change randomly, which is unpredictable.

As to the cyclic and seasonal patterns, the data access frequency may have some fluctuations. For example, the IO temperature of each data block may be collected periodically (for example, hourly), and each data block is analyzed and ranked based on the IO temperature, to determine an object to be relocated. However, if the access pattern of a data block is the cyclic pattern or seasonal pattern, analysis and judgment may lag, thereby producing a result not the best or even resulting in misjudgment.

For example, it is assumed data relocation is performed daily and access frequency of a data block is Hot-Cold-Hot-Cold-Hot in five days. After the first day analysis, the slice should be moved to the first tier 101 on the second day. On the second day, the slice having low access frequency, however, occupies the high performance tier. According to the second day analysis, the slice probably should be moved to the third tier 103 on the third day. As a matter of fact, the slice has high access frequency on the third day. It can be seen from above that, for the cyclic pattern or seasonal pattern, there still leaves an improvement space for the data relocation solution.

Figure 2:
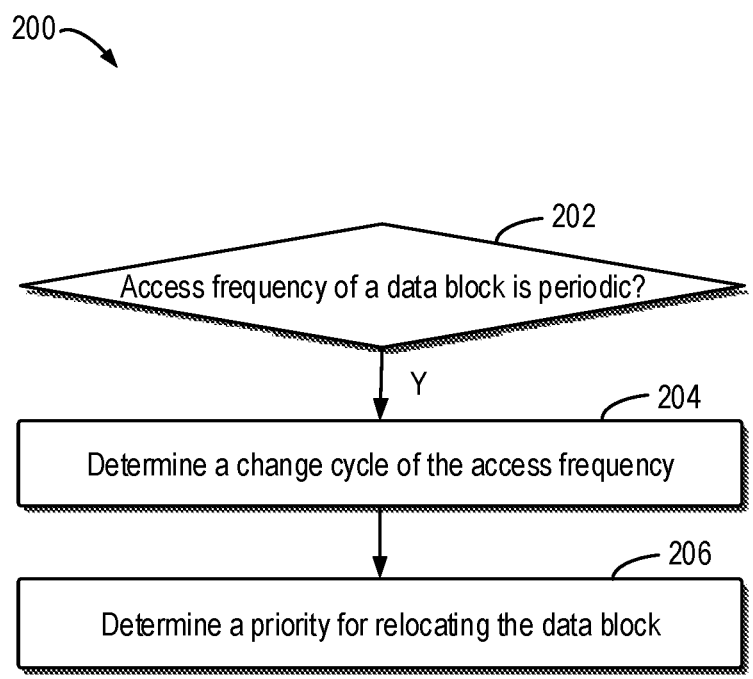
FIG. 2 illustrates a flowchart of a method for data relocation according to some embodiments of the present disclosure.

FIG. 2 illustrates a flowchart of a method 200 for data relocation according to some embodiments of the present disclosure. Reference will now be made to the storage system 100 as shown in FIG. 1 to describe the method 200, but it would be appreciated that the method 200 may also be applied to any other appropriate storage system.

At block 202, it is determined whether access frequency of a data block in the storage system is periodic. If the access pattern of the data bock is a cyclic pattern or seasonal pattern, the access frequency of the data block should be periodic.

Figure 3A:
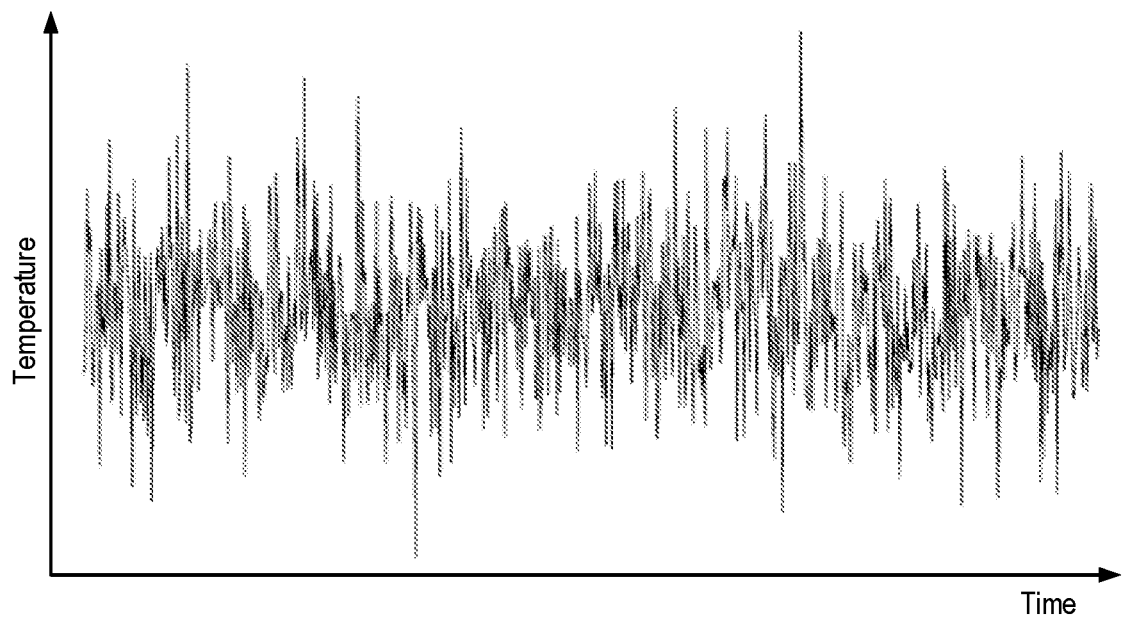
FIGS. 3A-3B illustrate diagrams of time series of access frequency data according to some embodiments of the present disclosure.
Figure 3B:
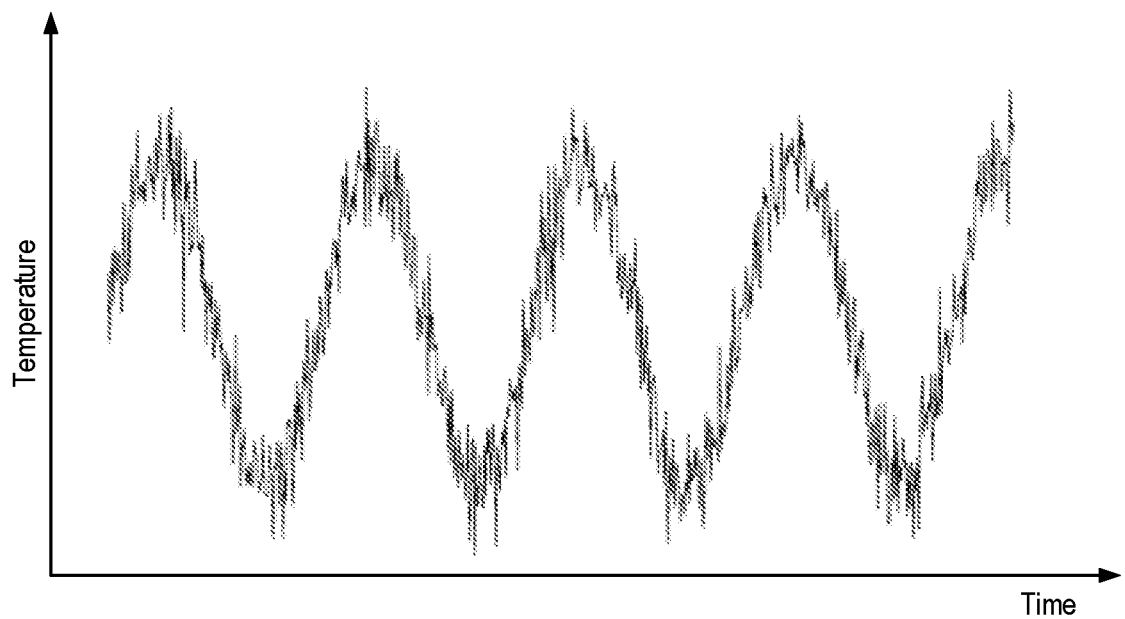

Access frequency of a data block may also be represented by Input/Output (I/O or IO). For example, hot data have high IO temperature while non-hot data have low IO temperature. FIGS. 3A and 3B illustrate an example of a time series for IO temperature of a data block in an irregular pattern and a cyclic pattern, respectively. The time series may be obtained by collecting the I/O temperature periodically (for example, hourly). As shown in FIG. 3A, the IO temperature is changed randomly and irregularly over time. As shown in FIG. 3B, the change of the IO temperature over time has periodic fluctuations. Therefore, whether the IO temperature or access frequency of the data block is periodic may be determined based on the change of the IO temperature or access frequency of the data block over time.

Figure 3C:
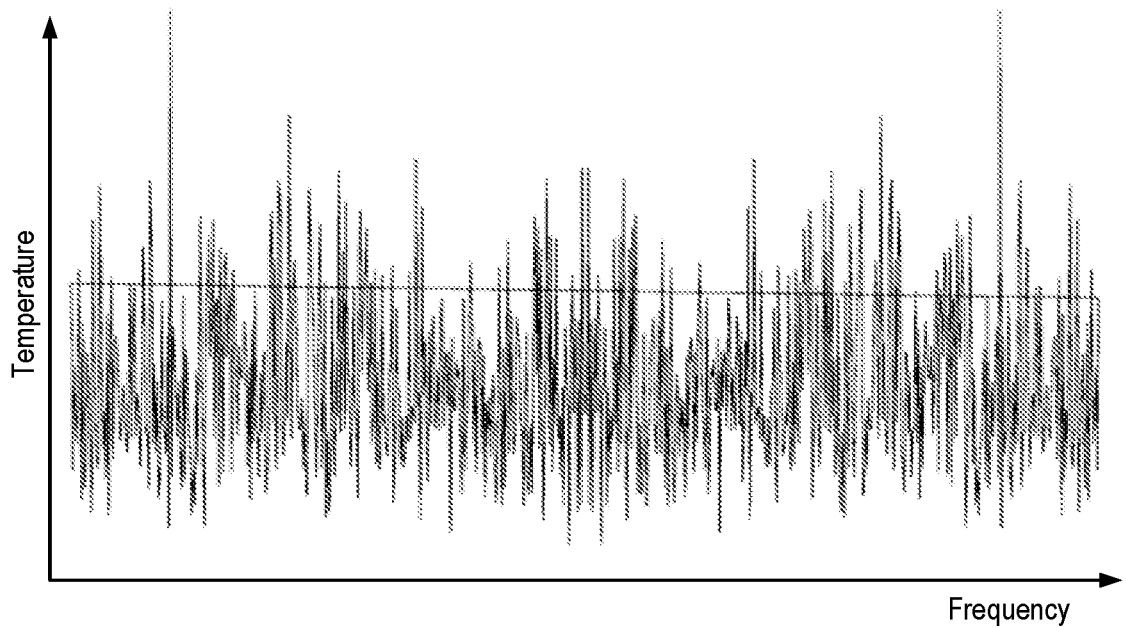
FIGS. 3C-3D illustrate diagrams of spectrum data of the time series as shown in FIGS. 3A-3B, according to some embodiments of the present disclosure.
Figure 3D:
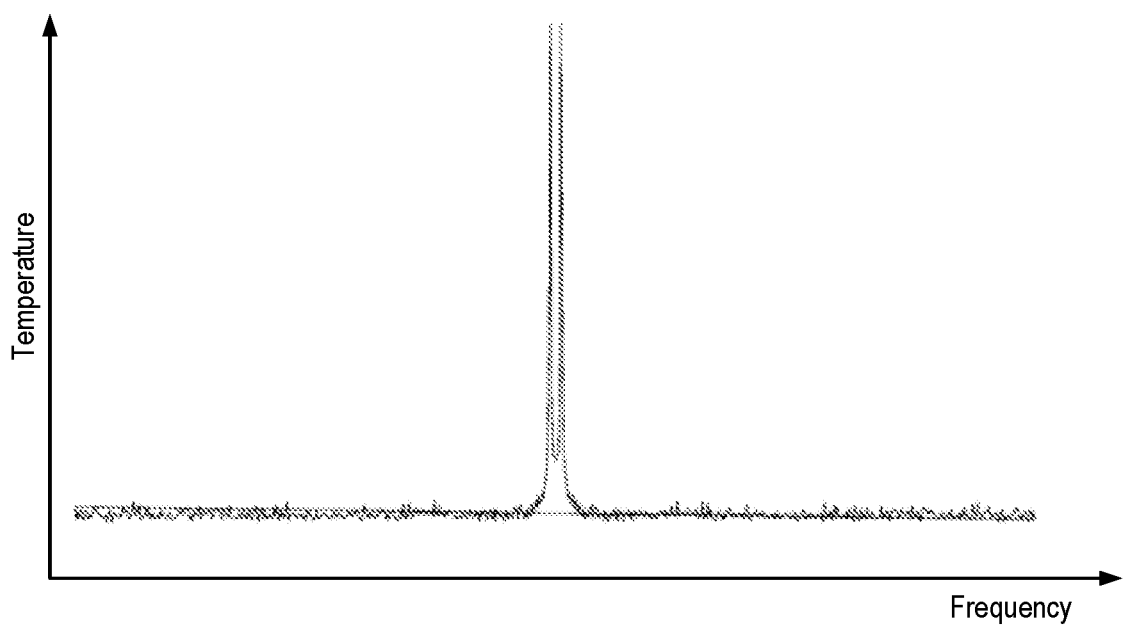

In some embodiments, whether the access frequency is periodic may be determined by performing spectrum analysis on access frequency. For example, Fourier Transform may be performed on access frequency to obtain spectrum data of the access frequency, and it is determined, based on the spectrum data, whether the access frequency is periodic. As to time series data, the Fourier Transform may be Discrete Fourier Transform (DFT). FIGS. 3C and 3D illustrate spectrum data of the time series as shown in FIGS. 3A and 3B, where the spectrum in FIG. 3C is in a mess while the spectrum in FIG. 3D has clear peaks. As a result, through spectrum analysis, it is much easier to determine whether the access frequency is periodic.

If it is determined at block 202 that the access pattern of the data block is periodic, the method 200 moves to block 204 where a change cycle of the access frequency of the data block is determined. For example, in the time series of FIG. 3B, a time difference between two adjacent peaks may be measured as a change cycle of the access frequency. A time difference between two adjacent valleys may also be measured as a change cycle of the access frequency. In addition, a time difference between an adjacent peak and valley may be measured as a half of a change cycle. Optionally, values of a plurality of change cycles may be measured and then averaged. Moreover, for example, in the spectrum data of FIG. 3D, peak frequency in the spectrum data may be determined, and then a respective change cycle may be computed based on the peak frequency.

At block 204, priority of relocating the data block may be determined based on the change cycle of the access frequency. For example, the priority represents a ranking of the data block if data relocation is performed currently. In some embodiments, an activity rate of the data block may be estimated based on the change cycle of the access frequency of the data block. For example, the activity rate of the data block may be estimated or determined based on access frequency of a previous change cycle. The priority of relocating the data block may be determined based on the obtained activity rate. For example, the activity rates of different data blocks are ranked to determine respective priority of relocating data blocks.

In some embodiments, it may be determined whether a change cycle of access frequency of a data block is greater than a relocation interval. If the change cycle is greater than the relocation interval, average access frequency within a period of time corresponding to the relocation interval in the previous cycle may be computed as an activity rate of the data block. If the change cycle is less than the relocation interval, average frequency of the data block within a previous change cycle may be computed as the activity rate of the data block.

In the method 200, taking the cycle or seasonality of the data block access frequency into account, the accuracy of the data block relocation may be further improved. In some embodiments, the activity rate of the data block may be determined based on historical data to further improve the accuracy of data relocation.

Figure 4:
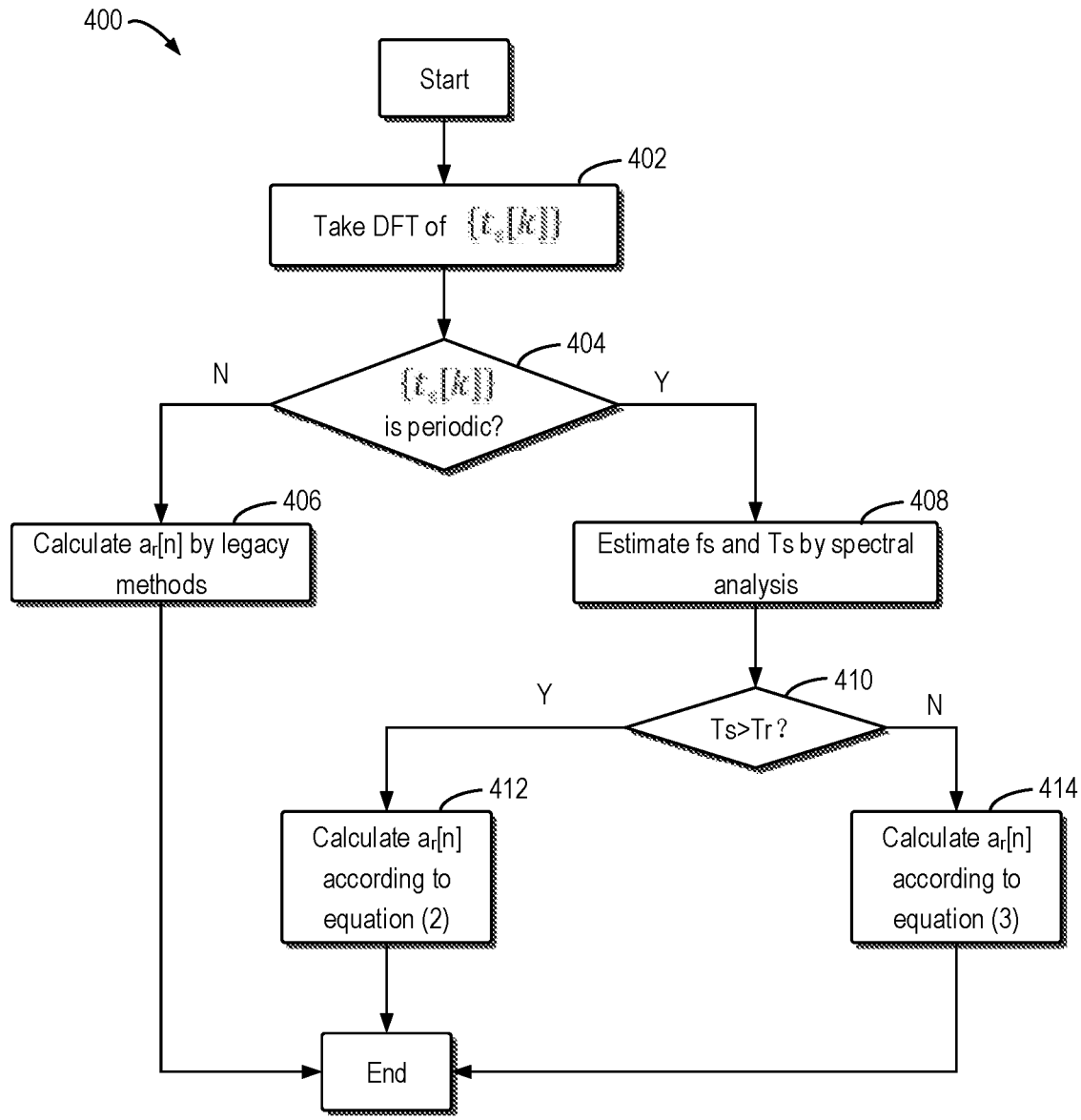
FIG. 4 illustrates a flowchart of a method for data relocation according to some embodiments of the present disclosure.

FIG. 4 illustrates a flowchart of a method 400 for data relocation according to some embodiments of the present disclosure. The method 400 may be implemented in the storage system 100 as shown in FIG. 1, or may be implemented in any other appropriate storage system. In addition, respective steps in the method 200 and 400 may be combined with or replace each other.

For ease of description, Table 1 illustrates symbols used in the method 400 and description thereof.

At block 402, Discrete Fourier Transform (DFT) may be performed on a time sequence $\{t_s[k]\}$. The DFT of a time sequence f(n), n=0, 1, ..., N−1 may be defined as follows:

$$F(m) = \sum_{n=0}^{N-1} f(n) e^{-2\pi \frac{nm}{N} i} \quad (1)$$

The temperature of the slice may be collected periodically, for example, hourly. The sequence of the collected historical temperature forms a time series $\{t_s[k]\}$. Thereafter, DFT and the spectrum analysis can be performed on the time series $\{t_s[k]\}$.

At block 404, it is determined, based on the result of the spectrum analysis, whether the time sequence $\{t_s[k]\}$ is periodic. If it is determined at block 404 that the time series is not periodic, the method 400 moves to 406 where the activity rate of the slice is computed through a conventional method.

If it is determined at block 404 that the time series is periodic, the method 400 moves to block 408 where the cycle of the time series is determined through spectrum analysis. For example, the frequency $f_s$ that maximizes the spectrum may be determined, and then the cycle of the time series may be computed through $T_s = 1/f_s$.

Figure 5:
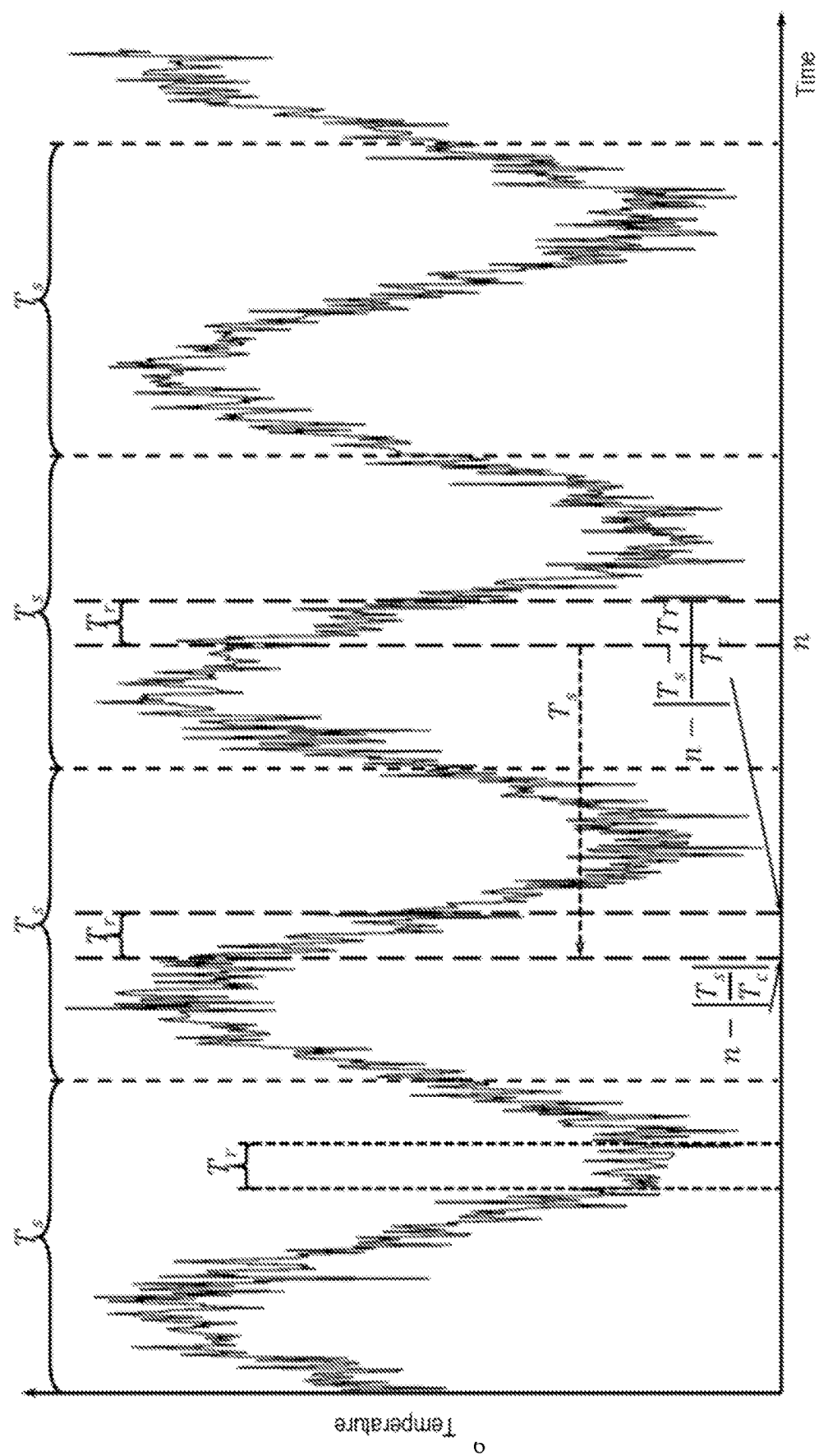
FIG. 5 illustrates a schematic diagram of a activity rate computing method according to some embodiments of the present disclosure.

Depending on a law of temperature change of the slice, an activity rate $a_r[n]$ of a slice at time n can be determined based on the cycle of the temperature change. At block 410, it is determined whether the temperature change cycle $T_s$ is greater than $T_r$. If it is determined at block 410 that $T_s$ is greater than $T_r$, the method 400 moves to block 412 where the activity rate $a_r[n]$ is computed based on the average temperature over the relocation interval $T_r$ in the previous change cycle $T_s$. As shown in FIG. 5, the relocation interval in the previous change cycle $T_s$ may be defined by $$n - \left\lfloor \frac{T_s - T_r}{T_c} \right\rfloor \text{ and } n - \left\lfloor \frac{T_s}{T_c} \right\rfloor.$$

TABLE 1

Symbols and Description thereof

| Symbol | Description |
|---|---|
| $T_r$ | a slice relocation interval; for example, $T_r$ = 1 day = 86400 s; automatically triggered slice relocation happens every $T_r$. |
| $T_c$ | an update cycle of a relocation candidate list; for example, $T_c$ = 1 hour = 3600 s; the relocation candidate list is updated every $T_c$. |
| $T_s$ | If an access pattern of a slice is cyclic or seasonal, $T_s$ represents a cycle of temperature change of a slice. |
| $f_s$ | If an access pattern of a slice is cyclic or seasonal, $f_s$ represents frequency of temperature change of a slice; it may be estimated through spectrum analysis; $T_s = 1/f_s$ ° |
| $a_r[n]$ | $n \in \mathbb{N}$; an activity rate of a slice at time n determines the position of the slice in the relocation candidate list. |
| $\{t_s[k]\}$ | $k \in \mathbb{N}$; a sequence of historical temperature of a slice collected every $T_c$. |
| $\lfloor X \rfloor$ | The rounded value of X. |

Hence, the activity rate $a_r[n]$ may be computed through the following formula (2):

$$a_r[n] = \left|\frac{T_c}{T_r}\right| \cdot \sum_{k=n-\left\lceil\frac{T_s}{T_c}\right\rceil}^{n-\left\lceil\frac{T_s-T_r}{T_c}\right\rceil} t_s[k] \quad (2)$$

Figure 6:
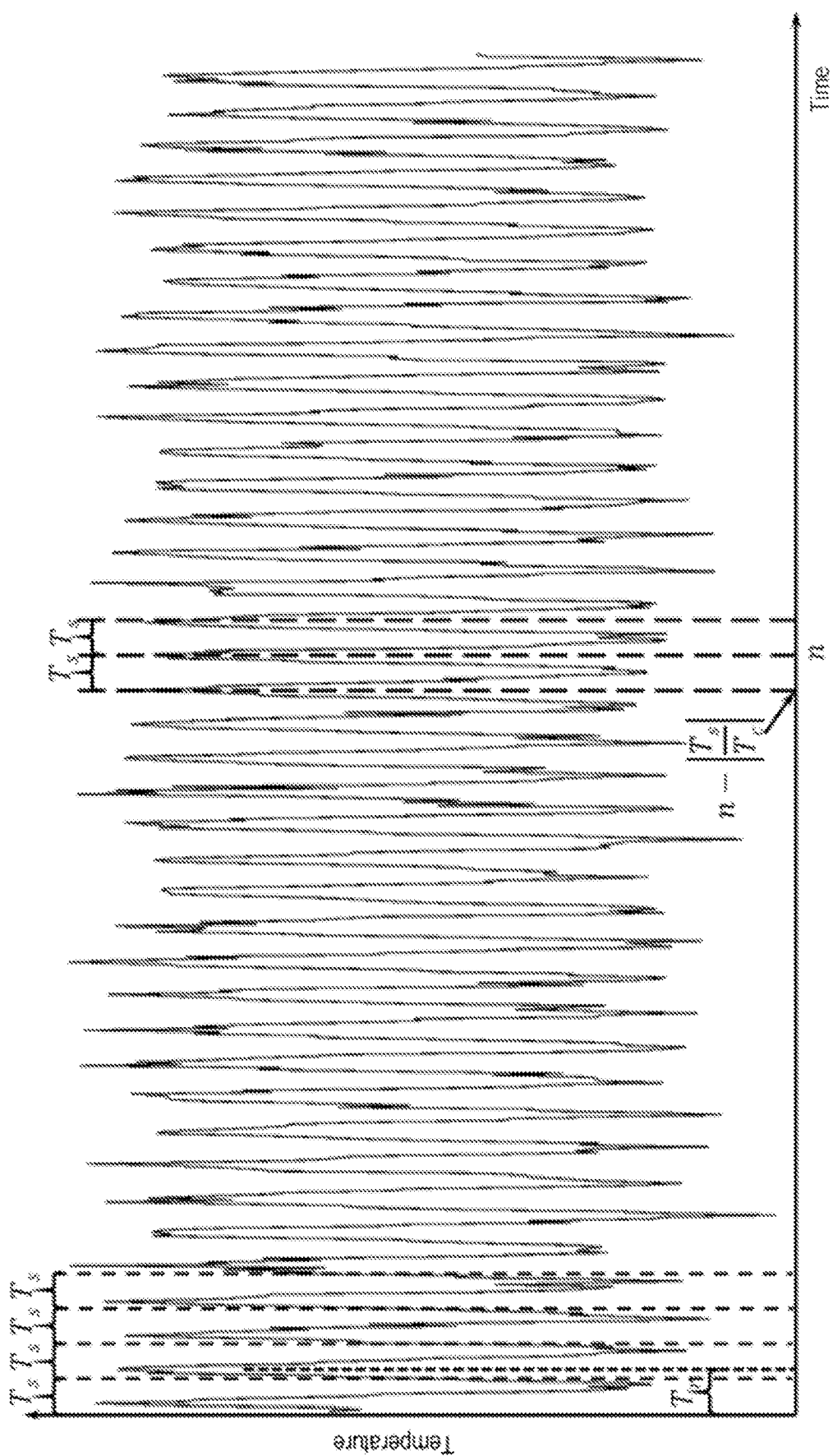
FIG. 6 illustrates a schematic diagram of an activity rate computing method according to some embodiments of the present disclosure.

If it is determined at block 410 that $T_s$ is less than $T_r$, the method 400 moves to block 414 where the activity rate $a_r[n]$ is computed based on the average temperature in the previous change cycle $T_s$. As shown in FIG. 6, the previous change cycle $T_s$ may be defined by $$n - \left\lceil\frac{T_s}{T_c}\right\rceil$$

and n−1. As a result, the activity rate $a_r[n]$ may be computed through the following formula (3):

$$a_r[n] = \left|\frac{T_c}{T_s}\right| \cdot \sum_{k=n-\left\lceil\frac{T_s}{T_c}\right\rceil}^{n-1} t_s[k] \quad (3)$$

Through the method 400, an activity rate of a slice can be determined accurately and efficiently, and activity rates of slices can be ranked to determine positions of respective slices in a relocation candidate list.

Figure 7:
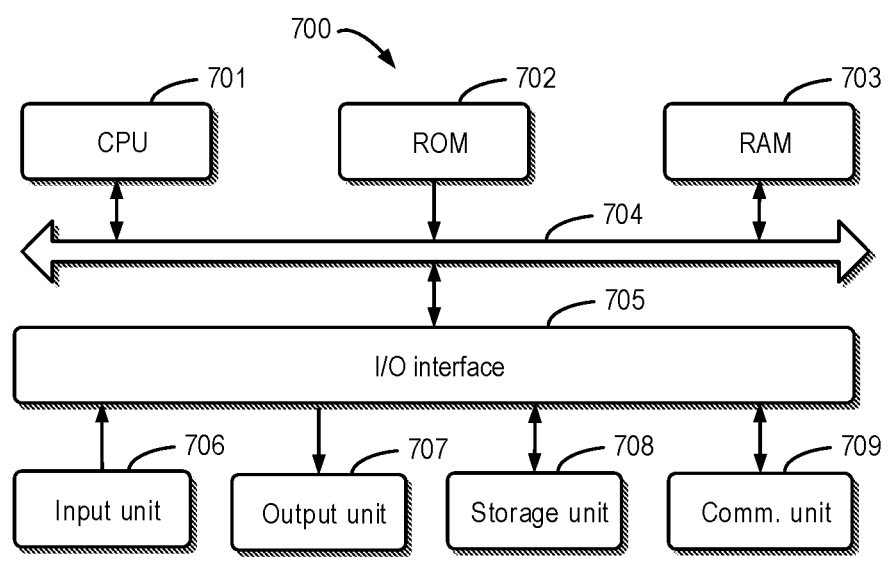
FIG. 7 illustrates a schematic block diagram of an example device that can be used to implement embodiments of the present disclosure, according to some embodiments of the present disclosure.

FIG. 7 illustrates a device 700 that can implement embodiments of the present disclosure. As shown, the device 700 includes a central processing unit (CPU) 701 that can perform various appropriate acts and processing based on computer program instructions stored in a read-only memory (ROM) 702 or computer program instructions loaded from a storage unit 708 to a random access memory (RAM) 703. In the RAM 703, there further store various programs and data needed for operations of the device 700. The CPU 701, ROM 702 and RAM 703 are connected to each other via a bus 704. An input/output (I/O) interface 705 is also connected to the bus 704.

The following components in the device 700 are connected to the I/O interface 705: an input unit 706, such as a keyboard, a mouse and the like; an output unit 707, such as various kinds of displays and a loudspeaker, etc.; a storage unit 708, such as a magnetic disk, an optical disk, and etc.; a communication unit 709, such as a network card, a modem, and a wireless communication transceiver, etc. The communication unit 709 allows the device 700 to exchange information/data with other devices through a computer network such as the Internet and/or various kinds of telecommunications networks.

Various processes and processing described above, e.g., the methods 200 and 400, can be executed by the processing unit 701. For example, in some embodiments, the methods 200 and 400 can be implemented as a computer software program that is tangibly embodied on a machine readable medium, e.g., the storage unit 708. In some embodiments, part or all of the computer programs can be loaded and/or mounted onto the device 700 via ROM 702 and/or communication unit 709. When the computer program is loaded to the RAM 703 and executed by the CPU 701, one or more steps of the methods 200 and 400 as described above can be executed.

The present disclosure can be a method, a device, a system and/or a computer program product. The computer program product can include a computer readable storage medium on which computer readable program instructions are carried out for performing each aspect of the present application.

The computer readable medium may be a tangible medium that may contain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium would include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It would be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for data relocation in a multi-tier storage system, comprising:
    determining whether access frequency of a data block in the multi-tier storage system is periodic;
    in response to determining that the access frequency of the data block is periodic, determining a change cycle of the access frequency of the data block; and
    determining, based on the change cycle of the access frequency of the data block, priority of relocating the data block in the multi-tier storage system;
wherein determining the priority of relocating the data block comprises:
    estimating, based on the change cycle of the access frequency of the data block, an activity rate of the data block; and
    determining, based on the estimate of the activity rate, the priority of relocating the data block;
wherein the multi-tier storage system includes a first tier that provides data access at a first speed and a second tier that provides data access at a second speed that is different from the first speed; and
wherein the method further comprises:
    after the priority of relocating the data block is determined, moving the data block from the first tier to the second tier based on a priority ranking of the data block among others.

2. The method of claim 1, wherein determining whether the access frequency is periodic comprises:
    determining whether the access frequency is periodic by performing spectrum analysis on the access frequency.

3. The method of claim 2, wherein determining whether the access frequency is periodic by performing the spectrum analysis comprises:
    performing a Fourier Transform on the access frequency to obtain spectrum data of the access frequency; and
    determining, based on the spectrum data, whether the access frequency is periodic.

4. The method of claim 3, wherein determining the change cycle comprises determining, based on the spectrum data, the change cycle of the access frequency of the data block.

5. The method of claim 1, wherein determining the activity rate of the data block comprises:
    determining whether the change cycle of the access frequency of the data block is greater than a relocation interval;
    in response to determining that the change cycle is greater than the relocation interval, computing average access frequency of the data block within a period of time in a previous change cycle corresponding to the relocation interval as the activity rate; and
    in response to determining that the change cycle is less than the relocation interval, computing average access frequency of the data block within the previous change cycle as the activity rate.

6. A device for data relocation in a multi-tier storage system, comprising:
- a processing unit; and
- a memory coupled to the processing unit and having instructions stored thereon, the instructions when executed by the processing unit causing the device to execute acts comprising:
  - determining whether access frequency of a data block in the multi-tier storage system is periodic;
  - in response to determining that the access frequency of the data block is periodic, determining a change cycle of the access frequency of the data block; and
  - determining, based on the change cycle of the access frequency of the data block, priority of relocating the data block in the multi-tier storage system;

wherein determining the priority of relocating the data block comprises:
- estimating, based on the change cycle of the access frequency of the data block, an activity rate of the data block; and
- determining, based on the estimate of the activity rate, the priority of relocating the data block;

wherein the multi-tier storage system includes a first tier that provides data access at a first speed and a second tier that provides data access at a second speed that is different from the first speed; and wherein the acts further comprise:
- after the priority of relocating the data block is determined, moving the data block from the first tier to the second tier based on a priority ranking of the data block among others.

7. The device of claim 6, wherein determining whether the access frequency is periodic comprises:
- determining whether the access frequency is periodic by performing spectrum analysis on the access frequency.

8. The device of claim 7, wherein determining whether the access frequency is periodic by performing the spectrum analysis comprises:
- performing a Fourier Transform on the access frequency to obtain spectrum data of the access frequency; and
- determining, based on the spectrum data, whether the access frequency is periodic.

9. The device of claim 8, wherein determining the change cycle comprises determining, based on the spectrum data, the change cycle of the access frequency of the data block.

10. The device of claim 6, wherein determining the activity rate of the data block comprises:
- determining whether the change cycle of the access frequency of the data block is greater than a relocation interval;
- in response to determining that the change cycle is greater than the relocation interval, computing average access frequency of the data block within a period of time in a previous change cycle corresponding to the relocation interval as the activity rate; and
- in response to determining that the change cycle is less than the relocation interval, computing average access frequency of the data block within the previous change cycle as the activity rate.

11. A computer program product having a non-transitory computer readable medium which stores a set of instructions to perform data relocation in a multi-tier storage system; the set of instructions, when carried out by computerized circuitry, causing the computerized circuitry to perform a method of:
- determining whether access frequency of a data block in the multi-tier storage system is periodic;
- in response to determining that the access frequency of the data block is periodic, determining a change cycle of the access frequency of the data block; and
- determining, based on the change cycle of the access frequency of the data block, priority of relocating the data block in the multi-tier storage system;

wherein determining the priority of relocating the data block comprises:
- estimating, based on the change cycle of the access frequency of the data block, an activity rate of the data block; and
- determining, based on the estimate of the activity rate, the priority of relocating the data block;

wherein the multi-tier storage system includes a first tier that provides data access at a first speed and a second tier that provides data access at a second speed that is different from the first speed; and wherein the method further comprises:
- after the priority of relocating the data block is determined, moving the data block from the first tier to the second tier based on a priority ranking of the data block among others.

12. The computer program product of claim 11, wherein determining the activity rate of the data block comprises:
- determining whether the change cycle of the access frequency of the data block is greater than a relocation interval;
- in response to determining that the change cycle is greater than the relocation interval, computing average access frequency of the data block within a period of time in a previous change cycle corresponding to the relocation interval as the activity rate; and
- in response to determining that the change cycle is less than the relocation interval, computing average access frequency of the data block within the previous change cycle as the activity rate.

13. The computer program product of claim 11, wherein determining whether the access frequency is periodic comprises:
- determining whether the access frequency is periodic by performing spectrum analysis on the access frequency.

14. The computer program product of claim 13, wherein determining whether the access frequency is periodic by performing the spectrum analysis comprises:
- performing a Fourier Transform on the access frequency to obtain spectrum data of the access frequency; and
- determining, based on the spectrum data, whether the access frequency is periodic.

15. The computer program product of claim 14, wherein determining the change cycle comprises determining, based on the spectrum data, the change cycle of the access frequency of the data block.

* * * * *